United States Patent [19]

Courlias

[11] Patent Number: 5,496,886
[45] Date of Patent: Mar. 5, 1996

[54] ONE-COAT ADHESIVE FOR BONDING CASTABLE URETHANES TO METAL

[75] Inventor: Michael P. Courlias, Erie, Pa.

[73] Assignee: Lord Corporation, Cary, N.C.

[21] Appl. No.: 333,435

[22] Filed: Nov. 2, 1994

[51] Int. Cl.⁶ .................................................. C08K 3/00
[52] U.S. Cl. .......................................... 524/540; 524/541
[58] Field of Search ..................................... 524/540, 541

[56] References Cited

U.S. PATENT DOCUMENTS

| | | |
|---|---|---|
| 4,167,500 | 9/1979 | Jazenski et al. . |
| 4,367,318 | 1/1983 | Ishimura et al. ........................ 525/481 |
| 4,483,962 | 11/1984 | Sadowski . |
| 4,946,911 | 8/1990 | Treybig ..................................... 525/514 |
| 5,036,122 | 7/1991 | Auerbach et al. . |
| 5,200,455 | 4/1993 | Warren . |
| 5,200,459 | 4/1993 | Weih et al. . |
| 5,281,638 | 1/1994 | Mowrey . |
| 5,300,555 | 4/1994 | Weih et al. . |

*Primary Examiner*—Bernard Lipman
*Attorney, Agent, or Firm*—Wayne W. Rupert

[57] ABSTRACT

An aqueous adhesive composition for bonding a castable urethane to a metal substrate during the curing cycle of the urethane contains (a) a water-soluble or water-dispersible phenoxy resin, (b) a water-soluble or water-dispersible phenolic resole resin; and (c) the balance being water.

9 Claims, No Drawings

ONE-COAT ADHESIVE FOR BONDING CASTABLE URETHANES TO METAL

BACKGROUND OF THE INVENTION

1. Field of the Invention

The present invention relates to a one-coat aqueous adhesive for bonding castable urethanes to various metals during the molding cycle of the urethane, and comprising a phenoxy resin plus a phenolic resole resin.

2. The Prior Art

Volatile organic compounds (VOC's) have been under strict governmental regulations which are getting stricter. The use of organic solvent-borne adhesives for bonding castable urethane-to-metal substrates is no longer desirable; and aqueous adhesive systems have become more desirable in order to reduce the VOC's so as to abide by these strict regulations. By using a VOC-compliant aqueous adhesive, it is possible to bypass expensive solvent-handling problems.

Examples of aqueous adhesive compositions are as follows.

Jazanski et al., U.S. Pat. No. 4,167,500, discloses storage-stable, heat-reactive aqueous compositions comprising at least one novolak phenolic resin, at least one formaldehyde polymer, and water, wherein the formaldehyde polymer is present in an amount sufficient to crosslink the novolak resin.

Sadowski U.S. Pat. No. 4,483,962 discloses terpolymer latexes prepared by emulsion polymerization of 2,3-dichloro-1,3-butadiene and a mixture of at least two different unsaturated monomers, with these unsaturated monomers being at least individually copolymerizable with 2,3-dichloro-1,3 -butadiene, adhesive systems.

Auerbach et al., U.S. Pat. No. 5,036,122, discloses an adhesive composition for bonding metal to natural or synthetic rubber, composed of a latex, an aromatic nitroso compound, and a polymaleimide compound.

Warren U.S. Pat. No. 5,200,455 discloses an aqueous primer composition containing a polyvinyl alcohol-stabilized aqueous phenolic resin dispersion, a latex of a halogenated polyolefin, and a metal oxide. The phenolic resin dispersion is prepared by mixing (a) a pre-formed, solid substantially water-insoluble, phenolic resin; (b) water; (c) an organic coupling solvent; and (d) polyvinyl alcohol, at a temperature and for a period of time sufficient to form a dispersion of the phenolic resin in water.

Weih et al., U.S. Pat. No. 5,200,459 discloses a butadiene heteropolymer latex prepared by emulsion polymerizing appropriate monomers in the presence of polyvinyl alcohol and a stabilizing solvent. The butadiene heteropolymer can be a butadiene copolymer or terpolymer prepared from butadiene monomers and comonomers such as α-haloacrylonitrile and acrylic acid.

Mowery U.S. Pat. No. 5,281,638 discloses an aqueous adhesive composition containing a chlorosulfonated polyethylene latex, a polymaleimide compound, a nitroso compound and a metal oxide.

Weih et al., U.S. Pat. No. 5,300,555 discloses a butadiene homopolymer latex prepared by emulsion polymerizing appropriate monomers in the presence of polyvinyl alcohol and a stabilizing solvent. The butadiene homopolymer lattices can be prepared without problem of coagulation and can be utilized effectively in adhesive compositions without the use of volatile solvents.

SUMMARY OF THE INVENTION

It is an object of the present invention to provide a one-coat adhesive for bonding castable urethanes to various substrates.

The above object is achieved according to the present invention by providing an aqueous adhesive system for bonding castable urethanes to metal substrates. The adhesive has excellent flexibility, metal adhesion and environmental resistance. This adhesive contains an amine-neutralized carboxylated phenoxy resin dispersible in water, a phenolic resole resin emulsion dispersible in water, and the balance being a water carrier system.

The isocyanate-functional urethanes which can be employed as the cast urethane compositions of the present invention comprise the reaction product between one or more organic compounds having at least two active hydrogen atoms and a stoichiometric excess of at least one polyisocyanate. Generally, such isocyanate-functional urethanes will be prepared by reacting a polyol, polyether, hydroxyl-terminated polyester, polyester amide, polyamide, or other polyfunctional active hydrogen compound with a diisocyanate or other polyisocyanate having up to eight functional isocyanate groups. Preferred reactants include polyhydroxy polyesters, polyhydroxy polyethers and polyisocyanates having two or three reactive isocyanate groups. An extensive description of some of the useful techniques for preparing isocyanate-functional urethanes can be found in Saunders and Frisch: *Polyurethanes, Chemistry and Technology*, Part II, Interscience (New York 1964), especially at pages 8 to 49, and in the references cited therein. Other preparative techniques which are known in the art can also be employed. Generally, any isocyanate-functional urethane known in the art can be employed in the practice of this invention, with such urethanes having a molecular weight of at least 500, particularly in the range of 1,000 to 10,000, being preferred.

Any of the polyisocyanates having at least two reactive isocyanate groups can be employed in forming isocyanate-functional urethanes suitable for use in the practice of the invention. Such polyisocyanates include, without limitation, aliphatic polyisocyanates such as 1,6-hexamethylene diisocyanate; 1,8-octamethylene diisocyanate; 1,12-dodecamethylene diisocyanate; 2,2,4-trimethylhexamethylene diisocyanate, and the like; 3,3' -diisocyanatodipropyl ether; 3-isocyanatomethyl-3,5,5' -trimethylcyclodexyl isocyanate; cyclopentalene-1,3 -diisocyanate; cyclodexylene-1,4,-diisocyanate; methyl 2,6 -diisocyanatocaprolate; bis-(2-isocyanatoethyl)-fumarate; 4-methyl-1,3-diisocyanatocyclohexane; trans-vinylene diisocyanate and similar unsaturated polyisocyanates; 4,4'-methylene-bis(cyclohexylisocyanate) and related polyisocyanates; methane diisocyanates; bis-(2 -isocyanatoethyl) carbonate and similar carbonate polyisocyanates; N,N',N"-tris-(6-isocyanatohexamethylene)biuret and relates polyisocyanates; as well as other known polyisocyanates derived from aliphatic polyamines; aromatic polyisocyanates such as toluene diisocyanates; xylene diisocyanates; dianisidine diisocyanate; 4,4'-diphenylmethane diisocyanate; 1-ethoxy-2,4-diisocyanatobenzene; 1-chloro-2,4 -diisocyanatobenzene; tris(4-isocyanatophenyl)methane; naphthalene diisocyanates; 4,4'-biphenyl diisocyanate; phenylene diisocyanates; 3,3'-dimethyl-4,4'-biphenyl diisocyanate; p-isocyanatobenzoyl isocyanates; tetrachloro-1,3-phenylene diisocyanate; and the like.

A suitable example of a castable urethane resin for use in the present invention is that sold under the trademark ADIPRENE® L167, manufactured by Uniroyal Chemical Co.

As the phenolic resole resin, there can be employed the aqueous dispersible or soluble heat-reactive condensation product of an aldehyde having from 1 to 8 carbon atoms, such as formaldehyde, acetaldehyde, isobutyraldehyde, ethylhexadelhyde, and the like, with phenolic compounds such as unsubstituted phenol, or substituted phenol such as o-cresol, m-cresol, p-cresol, mixed cresols, e.g., cresylic acid and m-cresol and/or p-cresol, xylenol, diphenylolpropane, p-butylphenol, p-tert-amylphenol, p-octylphenol, p,p'-dihydroxydiphenylether, and the like. Mixtures of dissimilar phenolic resole resins can be used.

The phenolic resole resins that are employed in the invention are well-known resole compositions. The resoles employed are normally base catalyzed resins having a formaldehyde factor (i.e., parts, by weight, of 40 weight percent aqueous formaldehyde per 100 parts by weight of unsubstituted phenol) of the order of about 90 to about 180.

One particularly desirable phenolic resole resin for use in the invention is a resole produced by reacting formaldehyde with phenol in a mol ratio of from about 2 to about 3.75 moles of formaldehyde per mole of phenol, in the presence of a catalytic amount of an alkali metal or barium oxide or hydroxide condensation catalyst, the reaction being carried out at elevated temperatures. The condensation reaction product is then neutralized to a pH of from about 3 to about 8. This phenolic resole resin is especially useful in the production of baked coatings for metals.

The phenolic resole resin that is employed need not be pulverized or ground to a very fine particle size, and it need not be dissolved in an organic solvent, prior to utilization in the process of the invention in the preparation of the aqueous dispersion. The phenolic resin will most typically be employed in the form of lumps, flakes or a coarse ground powder. The nature and production of the phenolic resins that are employed in the invention are well known in the art.

The invention may also utilize a coupling solvent, that is, a solvent that is miscible with water and which is a solvent for the phenolic resin employed. The miscibility with water should be complete, and the phenolic resin should be soluble in the coupling solvent such that solutions of up to about 80 weight percent phenolic resin (based on solution weight) can be made. The boiling point of the coupling solvent is preferably within the range of from about 70° C. to about 230° C.

Alcohols, glycol ethers, ethers, esters and ketones have been found to be the most useful coupling solvents. Specific examples of useful coupling solvents include ethanol, n-propanol, isopropyl alcohol, ethylene glycol monobutyl ether, ethylene glycol monoisobutyl ether, ethylene glycol monomethyl ether acetate, diethylene glycol monobutyl ether, diethylene glycol monoethyl ether acetate, propylene glycol monopropyl ether, methoxy acetone, and the like.

The polyvinyl alcohol employed in the invention is typically prepared by hydrolysis of polyvinyl acetate, and the most useful polyvinyl alcohol polymers for use in the invention are hydrolyzed to an extent of from about 85% to about 91%, and have a molecular weight such that a 4% solids solution of the polyvinyl alcohol in water has a viscosity of from about 4 to about 25 centipoises at 25° C.

The phenolic resole resin will preferably be formed in a conventional manner from the condensation of from about 0.8 to about 5 mols of aldehyde per mol of phenolic compound in the presence of base catalysts to provide an aqueous soluble resin having a molecular weight in the range from about 300 to about 2,000, preferably about 300 to 1,200. The phenolic resole resin is preferably compatible with the phenoxy component, and hence it is important that the phenolic resole resin be dispersible or soluble in an aqueous solvent system which is compatible with the phenoxy resin dispersion.

Suitable for use in the present invention as the phenolic resole resin emulsion is the phenolic dispersion BKUA-2370 or BKUA-2392, both sold under the trademark UCAR® by the Georgia Pacific Corporation of Atlanta, Ga. BKUA-2370 and BKUA-2392 are each a heat-resistant, crosslinkable aqueous dispersion which is stabilized with a non-ionic emulsifier, such as a polyvinyl alcohol.

Phenoxy reins are commercially important thermoplastic polymers derived from bisphenols and epichlorohydrin. Their molecular weights are higher, i.e., at least about 45,000, than those of conventional epoxy resins, i.e., 8,000 maximum. They lack terminal epoxide functionality and are therefore thermally stable and can be fabricated by conventional thermoforming techniques. The phenoxies have the same repeat unit as advanced epoxy resins and are classified as polyols or polyhydroxy ethers.

Phenoxy resins are prepared by reaction of high purity bisphenol A with epichlorohydrin in a 1:1 mole ratio. Solution polymerization may be employed to achieve the molecular weight and processibility needed.

A suitable example of a phenoxy resin that may be used in the present invention is a polymer of bisphenol "A", specifically, diglycidyl ethers of bisphenol "A". Suitable for use in the present invention as the phenoxy resin is that sold under the trademark UCAR® as Phenoxy Resin PKHW-35, and manufactured by Phenoxy Associates of the United States of America. UCAR® Phenoxy Resin PKHW-35 is an amine-neutralized, carboxylated phenoxy resin in water, and is a waterborne product that is surfactant-free, colloidal in natured with excellent emulsion stability from 0° C. to 55° C., exhibiting a high degree of consistency in viscosity and solids, and having up to 40 percent solids by weight.

Further examples of suitable amine neutralized, carboxylated phenoxy resins are those phenoxy resins which have been carboxylated with lower alkanoic acids having 1 to 6 carbon atoms such as formic acid, acetic acid, propionic acid, butyric acid, pentanoic acid and hexanoic acid, which have been amine neutralized, by reaction with ammonia or ammonium hydroxide.

The metal substrate can be a metal such as aluminum, copper, brass, bronze, iron or steel.

The present invention comprises an aqueous adhesive composition for bonding a molded castable urethane to a metal substrate during the molding cycle of the urethane. The composition comprises (a) a water-soluble or water-dispersible phenoxy resin, (b) a water-soluble or water-dispersible phenolic resole resin; and (c) the balance as water.

One embodiment is directed to an aqueous adhesive composition wherein the amount of the phenoxy resin comprises from 10% to 75% by weight, preferably from 26% to 65% by weight, based upon the total composition weight. The amount of the phenolic resole resin comprises from 5% to 70% by weight, preferably from 15% to 54% by weight, based upon the total composition weight; and the balance up to 100% by weight, based upon the total composition weight, is water.

Another embodiment is directed to an aqueous adhesive composition wherein the amount of the phenoxy resin comprises from 29% to 86% by weight, preferably from 43% to 71% by weight, based upon the total composition weight. The amount of the phenolic resole resin comprises from 11% to 56% by weight, preferably from 22% to 44%, based upon the total composition weight, and the balance up to 100% by weight, based upon the total composition weight, is water.

The process for utilizing the aqueous adhesive coating is carried out as follows. The surface of the metal is roughened, such as by grit-blasting, to produce grit-blasted steel (GBS). Then a prepared GBS is degreased. An adhesive blend of the phenoxy resin and phenolic resole resin emulsion in water is prepared by mixing the ingredients together. Then the emulsion is flowcoated, dipped or sprayed onto the GBS and allowed to dry at room temperature and then prebaked 2 hours at 250° F. The coated GBS was placed in the bottom of a mold and ADIPRENE® urethane was cast into the mold, and heated to 212° F. for about one-half hour. The polyurethane coated GBS sample was optionally post baked for about 1.5 hours at 212° F. in an oven. The bonded parts were allowed to sit at room temperature for 24 hours.

Primary Adhesion—Bonded parts are pulled to destruction according to ASTM Test D429-Method B. Parts are tested in peel with a peel angle of 45 degrees. The test is conducted at room temperature with a test speed of 20 inches per minute. After the bonded part fails, the peak peel strength value (measured in pounds) and the percent rubber retention on the adhesive coated area of the part are measured.

72-Hour Salt Spray—Bonded parts are buffed on the edges with a grinding wheel. The rubber is then tied back over the metal with stainless steel wire so as to stress the bonded area. This exposes the bond line to the environment. Failure is initiated by scoring the bond line with a razor blade. The parts are then strung on stainless steel wire and placed in a salt spray chamber. The environment inside the chamber is 100° F., 100 percent relative humidity, and 5 percent dissolved salt in the spray, which is dispersed throughout the chamber. The parts remain in this environment for 72 hours. Upon removal, the rubber is peeled per ASTM D429-B. The percent rubber retention and peel value on the part is then measured.

Two-Hour Boiling Water—Bonded parts are prepared the same way as they are for the salt spray test; however, in this test, the parts are placed in a beaker filled with boiling tap water. The parts remain in this environment for 2 hours. Upon removal, the rubber is peeled per ASTM A429-B. The percent rubber retention and peel value on the part is then measured.

Seven-Day Room Temperature Water-Immersion—Bonded parts are prepared the same way as they are for the salt spray test. In this test, the parts are placed in a beaker filled with tap water which is at room temperature. The parts remain in this environment for 7 days. Upon removal, the rubber is peeled per ASTM D429-B. The percent rubber retention and peel value on the part is then measured.

The results of the above tests are set forth in various tables below. In the data, reference is made to failure in the rubber body. Failure is expressed in terms of percent, and a high percent of failure in the urethane is desirable since this indicates that the adhesive bond is stronger than the rubber itself. "PBH" means "peel by hand." Degradation of the rubber metal bond was measured in terms of percent rubber retention (R), rubber-cement failure (RC), and cement-metal failure (CM).

The adhesive of the present invention has the advantage that, when bonding castable urethane polymer to metal such as a grit blasted steel, the combination of phenolic resin plus phenoxy resin produces significantly greater adhesion than would be expected from the adhesion due to the phenolic resin alone or due to the phenoxy resin alone.

Other objects and features of the present invention will become apparent from the following Examples, which disclose the embodiments of the present invention. It should be understood, however, that the Examples are designed for the purpose of illustration only and not as a definition of the limits of the invention.

DETAILED DESCRIPTION OF PREFERRED EMBODIMENTS

EXAMPLE 1

The following aqueous dispersion were prepared so as to evaluate blends of PKHW-35, BKUA 2370 and BKUA 2392.

|  | Formulations | | | | |
| --- | --- | --- | --- | --- | --- |
|  | A | B | C | D | E |
| (Phenoxy) PKHW-35 | 10 | 26 | 47 | 65 | 75 |
| (Phenolic) BKUA 2370 | 70 | 54 | 53 | 15 | 5 |
| $H_2O$ | 20 | 20 | 10 | 20 | 20 |
| DFT. (mils) | 0.93 | 1.08 | 1.47 | 1.2 | 1.3 |
|  | F | G | H | I | J |
| (Phenoxy) PKHW-35 | 9 | 24 | 44 | 63 | 74 |
| (Phenolic) BKUA 2392 | 71 | 56 | 36 | 17 | 6 |
| $H_2O$ | 20 | 20 | 20 | 20 | 20 |
| DFT. (mils) | 1.43 | 1.6 | 1.46 | 1.39 | 1.46 |

Control Adhesive: CHEMLOK ® 213
Substrate: GBS, degreased
Urethane: ADIPRENE ® LI67/MOCA
Prebake: 0 hr, 1 hr and 2 hrs @ 250° F.
Cure cycle: 30 min. 212° F. in mold
Post bake: 90 min @ 212° F. in oven
DET: —

The results are set forth below in Table 1.

TABLE 1

| Prebake | A | B | C | D | E |
| --- | --- | --- | --- | --- | --- |
| 0 hours | 55# 100RC | 65# 100RC |  | 195# 100RC | 155# 100RC |
|  | 50# 100RC | 95# 100RC | PBH | 140# 100RC | 150# 100RC |
|  | 35# 100RC | 70# 100RC |  | 115# 100RC | 170# 100RC |
| 1 hour | 235# 100RC | 200# 100RC | 270# SB 100R | 265# SB 60RC | 250# SB 45R |
|  | 210# 100RC | 230# 100RC | 270# SB 70R, RC | 270# SB 100R | 205# 30R, RC |
|  | 205# 100RC | 210# 100RC | 225# 30B, RC | 215# 10R, RC | 230# SB, R |
| 2 hours | 190# 100RC | 270# 100RC | 270# SB 100R | 245# SB, 80R, RC | 285# SB, 100R |
|  | 220# 100RC | 225# 100RC | 245# SB 70R, RC | 245# SB, 100R | 240# SB, 70R, R |

TABLE 1-continued

|  | 205# 100RC | 235# 100RC | 245# SB, 50R, RC | 255# SB, 85R, RC | 260# SB, 65R, 1 |
|---|---|---|---|---|---|
| Prebake | F | G | H | I | J |
| 0 hours | 40# 80RC, CM | 40# 85RC, CM | 105# 100RC | 115# 95RC, CM | 170# 100RC |
|  | 80# 80RC, CM | 105# 100RC, CM | 120# 100RC | 135# 95RC, CM | 180# 100RC |
|  | 95# 70RC, CM | 120# 100RC, CM | 125# 100RC | 55# 100RC | 145# 100RC |
| 1 hour | 40# 45RC, CM | 85# 100RC | 180# 10R, RC 215# 5R, RC | 200# 20R, RC | 230# 40R, 4R |
|  | 45# 95RC, CM | 95# 100RC | 185# 10R, RC 215# 5R, RC | 200# 10R, RC | 210# SB, 30R, RC |
|  | 105# 95RC, CM | 95# 100RC | 140# 5R, RC 200# 15B, RC | 205# 30R, RC | 245# SB, 85R, RC |
| 2 hours | 105# 15R, RC | 200# 20R, RC | 205# 25R, RC 215# 16R, RC | 260# 100R | 275# SB, 85R, RC |
|  | 125# 15R, 80RC, CM | 175# 15R, RC | 230# 25R, RC 240# 15R, RC | 260# SB, 80R, RC | 270# SB, 100R |
|  | 105# 20R, 75RC, CM | 160# 15R, RC | 225# 20R, RC 225# 20R, RC | 245# 45R, RC | 240# SB, 80R, RC |

EXAMPLE 2

Blends of PKHW-35 and BKUA 2370 were evaluated to determine minimum prebake requirements.

|  | Formulations | | | |
|---|---|---|---|---|
| Material | A | B | C | D |
| PKHW-35 | 47 | 65 | 75 | 80 |
| BKUA 2370 | 33 | 15 | 5 | 0 |
| dH$_2$O | 20 | 20 | 20 | 20 |
| dry wt ratio | 1:1 | 3:1 | 10:1 | 1:0 |

Substrate—GBS, degreased
DFT target—1 mil
Control adhesive—CHEMLOK® 213
Urethane—ADIPRENE® L167/MOCA
Prebake coated parts—0 min., 15 min., 30 min., 45 min., 1 hr and 2 hrs @ 250° F.
Cure cycle—30 min @ 212° F. in mold
Postbake—90 min @ 212° F. in oven
The results are set forth below in Table 2.

|  | 1 | 2 | 3 | 4 | 5 |
|---|---|---|---|---|---|
| PKHW-35 (Phenoxy) @ 35% tsc | 29 | 43 | 57 | 71 | 86 |
| BKUA 2370 (Phenolic) @ 45% tsc | 56 | 44 | 33 | 22 | 11 |
| DI Water | 15 | 13 | 10 | 7 | 8 |
|  | 100 | 100 | 100 | 100 | 100 |
| DFT, mils | 1.25 | 1.58 | 1.75 | 2.54 | 2.55 |
| TSC, % |  | 35 | 35 | 32 | 33 | 35 |

The control was CHEMLOK® 213 lot #325110. The substrate was GBS. The urethane was ADIPRENE® L167/MOCA. The cure was 30 min. in the mold at 212° F. The postcure was 90 min. in the oven at 212° F. The coated parts were prebaked 2 hours at 250° F. The primary adhesion was ASTM D429-B (2 in/min. at 45° angle).

The results were reported below in Table 3.

TABLE 2

| Adhesive | 0 | 15' | 30' | 45' | 1 hr | 2 hrs |
|---|---|---|---|---|---|---|
| A | PBH RC, CM | 55# 100RC | 125# 100RC | 230# 100RC | 210# 100RC | 275# 90RC, CM |
|  |  | 60# 100RC | 110# 100RC | 225# 100RC | 190# 100RC | 245# SB 10R, RC |
|  |  | 55# 100RC | 80# 100RC | 245# 100RC | 205# 100RC | 265# SB 80R, RC |
|  |  | 57# | 105# | 233# | 202# | 262# |
| B | 85# 100RC | 85# 100RC | 85# 100RC | 180# 100RC | 220# 100RC | 260# 60R, RC |
|  | 90# 100RC | 120# 100RC | 140# 100RC | 190# 100RC | 250# 50R, RC | 250# 50R, RC |
|  | 87# 100RC | 115# 100RC | 165# 100RC | 175# 100RC | 225# 100RC | 250# 20R, RC |
|  | 87# | 118# | 155# | 182# | 220# | 253# |
| C | 110# 65RC, CM | 120# 20RC, CM | 120# 10RC, CM | 130# 10RC, CM | 140# 100RC, CM | 140# 100CM |
|  | 120# 80RC, CM | 118# 15RC, CM | 130# 5RC, CM | 125# 10RC, CM | 140# 100CM | 130# 100CM |
|  | 120# 85RC, CM | 116# 25RC, CM | 120# 10RC, CM | 120# 5RC, CM | 125# 100CM | 120# 100CM |
|  | 117# | 118# | 123# | 125# | 135# | 130# |
| D | 85# 10RC, CM | 100# 10RC, CM | 100# 100CM | 100# 100CM | 90# 100CM | 150# 100CM |
|  | 95# 40RC, CM | 90# 5RC, CM | 85#, 100CM | 85# 100CM | 85# 100CM | 120# 100CM |
|  | 100# 100CM | 100# 10RC, CM | 95# 100CM | 110# 100CM | 100# 100CM | 100# 100CM |
|  | 93# | 92# | 93# | 102# | 92# | 123# |

EXAMPLE 3

Different blends of BKUA and PKHW were evaluated in order to narrow in on the best performing ratio blend.

The following formulations were made and parts were flowcoated:

TABLE 3

|  | CH 213 | #1 | #2 | #3 | #4 | #5 |
| --- | --- | --- | --- | --- | --- | --- |
| Ambient | 330# SB954, CM | 320# 75R, RC | 320# SB 90R, RC | 330# SB 100R | 325# SB 100R | 320# SB 70R, RC |
|  | 325# SB 100R | 275# 15R, RC | 320# SB 95R, RC | 335# SB 95R, RC | 325# SB 100R | 320# SB 75R, RC |
|  | 325# SB 100R | 300# 45R, RC | 320# SB 90R, RC | 310# SB 70R, RC | 335# SB 100R | 335# SB 90R, RC |
|  | 325# SB 100R | 325# 80R, RC | 325# SB 100R | 325# SB 100R | 335# SB 100R | 330# SB 75R, RC |
|  | 310# SB 100R | 310# 75R, RC | 325# SB 100R | 320# SB 100R | 320# SB 100R | 315# SB 100R |
|  | 315# SB 100R | 320# 70R, RC | 325# SB 100R | 335# SB 100R | 330# SB 100R | 335# SB 90R, RC |
| Avg. | 322# SB 99R, CM | 307# 60R, RC | 327# SB 92R, RC | 327# SB 94R, RC | 328# SB 100R | 326# SB 83R, RC |
| Std. dev. | 7.53 | 17.80 | 7.53 | 9.31 | 6.06 | 8.61 |

While several embodiments of the present invention have been shown and described, it is to be understood that many changes and modifications may be made thereunto without departing from the spirit and scope of the invention as defined in the appended claims.

What is claimed is:

1. An aqueous adhesive composition for bonding a molded castable urethane to a metal substrate during the molding cycle of the urethane, said composition comprising:
   (a) a water-soluble or water-dispersible thermoplastic phenoxy resin that includes substantially no terminal epoxide groups and comprises a reaction product of bisphenol A with epichlorohydrin;
   (b) a water-soluble or water-dispersible phenolic resole resin that comprises a condensation product of an aldehyde having from 1 to 8 carbon atoms with a phenolic compound; and
   (c) the balance up to 100% by weight, based on the total composition weight, being water.

2. The aqueous adhesive composition of claim 1,
   (a) wherein the amount of said phenoxy resin comprises from 10% to 75% by weight based upon the total composition weight;
   (b) wherein the amount of said phenolic resole resin comprises from 5% to 70% by weight based upon the total composition weight; and
   (c) the balance up to 100% by weight, based upon the total composition weight, being water.

3. The aqueous adhesive composition of claim 1,
   (a) wherein the amount of said phenoxy resin comprises from 26% to 65% by weight based upon the total composition weight;
   (b) wherein the amount of said phenolic resole resin comprises from 15% to 54% by weight based upon the total composition weight; and
   (c) the balance up to 100% by weight, based upon the total composition weight, being water.

4. The aqueous adhesive composition of claim 1,
   (a) wherein the amount of said phenoxy resin comprises from 29% to 86% by weight based upon the total composition weight;
   (b) wherein the amount of said phenolic resole resin comprises from 11% to 56% by weight based upon the total composition weight; and
   (c) the balance up to 100% by weight, based upon the total composition weight, being water.

5. The aqueous adhesive composition of claim 1,
   (a) wherein the amount of said phenoxy resin comprises from 43% to 71% by weight based upon the total composition weight;
   (b) wherein the amount of said phenolic resole resin comprises from 22% to 44% by weight based upon the total composition weight; and
   (c) the balance up to 100% by weight, based upon the total composition weight, being water.

6. The aqueous adhesive composition of claim 1, wherein the phenoxy resin of (a) is a diglycidyl ether of bisphenol "A."

7. The aqueous adhesive composition of claim 1, wherein the phenoxy resin of (a) is an amine neutralized carboxylated phenoxy resin.

8. The aqueous adhesive composition of claim 1, wherein the phenoxy resin of (a) is a phenoxy resin carboxylated with a lower alkanoic acid having 1 to 6 carbon atoms and amine neutralized with ammonia or ammonium hydroxide.

9. The aqueous adhesive composition of claim 1, wherein the phenolic resole resin of (b) a condensation product of from about 0.8 to about 5 mols of aldehyde per mol of phenolic compound in the presence of a base catalyst to produce an aqueous soluble resin having a molecular weight in the range from about 300 to about 2,000.

* * * * *

UNITED STATES PATENT AND TRADEMARK OFFICE
CERTIFICATE OF CORRECTION

PATENT NO. : 5,496,886
DATED : March 5, 1996
INVENTOR(S) : Michael P. Gourlias

It is certified that error appears in the above-indentified patent and that said Letters Patent is hereby corrected as shown below:

On the title page: Item [75]

Replace "Courlias" with --Gourlias--.

Signed and Sealed this

Twenty-fifth Day of June, 1996

*Attest:*

BRUCE LEHMAN

*Attesting Officer*  *Commissioner of Patents and Trademarks*